United States Patent
Fukukita et al.

[11] Patent Number: 6,099,472
[45] Date of Patent: Aug. 8, 2000

[54] ULTRASONIC DIAGNOSTIC SYSTEM USING A NONLINEARITY OF AN EXAMINED BODY WITH RESPECT TO PROPAGATION OF ULTRASONIC WAVE

[75] Inventors: Hiroshi Fukukita, Tokyo; Morio Nishigaki, Fujisawa, both of Japan

[73] Assignee: Matsushita Electric Industrial Co., Ltd., Osaka, Japan

[21] Appl. No.: 09/299,001

[22] Filed: Apr. 26, 1999

[30] Foreign Application Priority Data

Sep. 21, 1998 [JP] Japan .................................. 10-266977

[51] Int. Cl.$^7$ ...................................................... A61B 8/00
[52] U.S. Cl. ........................................... 600/443; 600/447
[58] Field of Search ..................................... 600/437, 443, 600/447; 73/625, 626; 367/2, 11, 103, 105, 138

[56] References Cited

U.S. PATENT DOCUMENTS

| | | | |
|---|---|---|---|
| 3,778,757 | 12/1973 | Houston | 340/5 MP |
| 5,653,235 | 8/1997 | Teo | 600/447 |
| 5,664,572 | 9/1997 | Kishimoto | 600/443 |
| 5,776,066 | 7/1998 | Nock et al. | 600/443 |
| 5,891,038 | 4/1999 | Seyed-Bolorforosh et al. | 600/447 |
| 5,908,390 | 6/1999 | Matsushima | 600/447 |
| 5,961,461 | 10/1999 | Mo et al. | 600/443 |

FOREIGN PATENT DOCUMENTS

61-279235  12/1986  Japan .

*Primary Examiner*—Marvin M. Lateef
*Assistant Examiner*—Ali M. Imam
*Attorney, Agent, or Firm*—Louis Woo

[57] ABSTRACT

An ultrasonic diagnostic system includes a transducer. A first electric drive signal is fed to the transducer. A second electric drive signal is fed to the transducer at a time different from a time of the feed of the first electric drive signal thereto. The second electric drive signal has a waveform different from a waveform of the first electric drive signal. A first received signal is derived from an output signal of the transducer. The first received signal represents ultrasonic echoes related to an ultrasonic beam caused by the transducer in response to the first electric drive signal. A second received signal is derived from the output signal of the transducer. The second received signal represents ultrasonic echoes related to an ultrasonic beam caused by the transducer in response to the second electric drive signal. The first received signal is subjected to a waveform equalizing process, thereby being converted into a third received signal having a waveform corresponding to a waveform of the second received signal. A calculator operates for calculating a difference between the second received signal and the third received signal, and generating a signal representing the calculated difference.

10 Claims, 6 Drawing Sheets

ULTRASONIC DIAGNOSTIC SYSTEM USING A NONLINEARITY OF AN EXAMINED BODY WITH RESPECT TO PROPAGATION OF ULTRASONIC WAVE

BACKGROUND OF THE INVENTION

1. Field of the Invention

This invention relates to an ultrasonic diagnostic system or an ultrasound imaging system using a nonlinearity of an examined body with respect to propagation of ultrasonic wave.

2. Description of the Related Art

In general, a human body has a nonlinearity with respect to propagation of ultrasonic wave. Therefore, as the ultrasonic wave is propagated in the human body, it is distorted by the nonlinearity. An effective nonlinearity of a human body tends to depend on the amplitude of ultrasonic wave propagated therein.

There is a known ultrasonic diagnostic system using such a nonlinearity of a body to be examined. The known ultrasonic diagnostic system includes a transducer to which an electric drive pulse signal is fed during a transmission process. The transducer converts the electric drive pulse signal to a corresponding ultrasonic pulse wave emitted into the examined body. The amplitude of the electric drive pulse signal is changed between two levels to vary the amplitude of the ultrasonic pulse wave. Thus, the known ultrasonic diagnostic system requires a power feed device designed to change the amplitude of the electric drive pulse signal. Such a power feed device causes a complicated structure of the known ultrasonic diagnostic system.

SUMMARY OF THE INVENTION

It is an object of this invention to provide an improved ultrasonic diagnostic system using a nonlinearity of an examined body with respect to propagation of ultrasonic wave.

A first aspect of this invention provides an ultrasonic diagnostic system comprising a transducer; first means for feeding a first electric drive signal to the transducer; second means for feeding a second electric drive signal to the transducer at a time different from a time at which the first means feeds the first electric drive signal to the transducer, the second electric drive signal having a waveform different from a waveform of the first electric drive signal; third means for deriving a first received signal from an output signal of the transducer, the first received signal representing ultrasonic echoes related to an ultrasonic beam caused by the transducer in response to the first electric drive signal; fourth means for deriving a second received signal from the output signal of the transducer, the second received signal representing ultrasonic echoes related to an ultrasonic beam caused by the transducer in response to the second electric drive signal; fifth means for subjecting the first received signal to a waveform equalizing process to convert the first received signal into a third received signal having a waveform corresponding to a waveform of the second received signal; and sixth means for calculating a difference between the second received signal and the third received signal, and generating a signal representing the calculated difference.

A second aspect of this invention is based on the first aspect thereof, and provides an ultrasonic diagnostic system wherein the first electric drive signal and the second electric drive signal include pulse signals respectively, and are different from each other in pulse number.

A third aspect of this invention is based on the first aspect thereof, and provides an ultrasonic diagnostic system wherein the first electric drive signal includes a pulse; the second electric drive signal includes plural successive pulses; the fifth means comprises a series combination of delay circuits, a total number of which is equal to a total number of the plural successive pulses minus one; and the delay circuits provide signal delays corresponding to respective time intervals between the plural successive pulses.

A fourth aspect of this invention is based on the first aspect thereof, and provides an ultrasonic diagnostic system wherein the first electric drive signal includes a pulse and the second electric drive signal includes a pulse, and the pulse in the first electric drive signal has a width different from a width of the pulse in the second electric drive signal.

A fifth aspect of this invention is based on the fourth aspect thereof, and provides an ultrasonic diagnostic system wherein the fifth means comprises a delay circuit providing a signal delay corresponding to a difference of the width of the pulse in the second electric drive signal from the width of the pulse in the first electric drive signal.

A sixth aspect of this invention is based on the first aspect thereof, and provides an ultrasonic diagnostic system wherein the fifth means has a function of controlling a signal amplitude.

A seventh aspect of this invention provides an ultrasonic diagnostic system comprising a transducer; first means for feeding a first electric drive signal to the transducer; second means for feeding a second electric drive signal to the transducer at a time different from a time at which the first means feeds the first electric drive signal to the transducer, the second electric drive signal having a waveform different from a waveform of the first electric drive signal; third means for deriving a first received signal from an output signal of the transducer, the first received signal representing ultrasonic echoes related to an ultrasonic beam caused by the transducer in response to the first electric drive signal; fourth means for deriving a second received signal from the output signal of the transducer, the second received signal representing ultrasonic echoes related to an ultrasonic beam caused by the transducer in response to the second electric drive signal; fifth means for subjecting the first received signal to a waveform equalizing process to convert the first received signal into a third received signal having a waveform corresponding to a waveform of the second received signal; sixth means for calculating a difference between the second received signal and the third received signal, and generating a signal representing the calculated difference; seventh means for subjecting the first received signal to a detection process to derive a first detection-result signal from the first received signal; eighth means for subjecting the second received signal to a detection process to derive a second detection-result signal from the second received signal; ninth means for subjecting the difference signal generated by the sixth means to a detection process to derive a third detection-result signal from the difference signal; tenth means for combining the first detection-result signal, the second detection-result signal, and the third detection-result signal into a multiplexing-resultant signal; and eleventh means for indicating an image represented by the multiplexing-resultant signal generated by the tenth means.

An eighth aspect of this invention is based on the seventh aspect thereof, and provides an ultrasonic diagnostic system wherein the tenth means comprises means for combining the first detection-result signal, the second detection-result signal, and the third detection-result signal at a variable mixing ratio, and means for controlling the mixing ratio in accordance with a lapse of time.

A ninth aspect of this invention is based on the seventh aspect thereof, and provides an ultrasonic diagnostic system wherein the tenth means comprises means for combining the first detection-result signal, the second detection-result signal, and the third detection-result signal at a variable mixing ratio, and means for controlling the mixing ratio so that the first detection-result signal is predominant over the second and third detection-result signals in a small distance range, that the second detection-result signal is predominant over the first and third detection-result signals in a great distance range, and that the third detection-result signal is predominant over the first and second detection-result signals in an intermediate distance range between the small distance range and the great distance range.

A tenth aspect of this invention provides an ultrasonic diagnostic system comprising a transducer; first means for feeding a first electric drive signal to the transducer; second means for feeding a second electric drive signal to the transducer at a time different from a time at which the first means feeds the first electric drive signal to the transducer, the second electric drive signal having a waveform different from a waveform of the first electric drive signal; third means for deriving a first received signal from an output signal of the transducer, the first received signal representing ultrasonic echoes related to an ultrasonic beam caused by the transducer in response to the first electric drive signal; fourth means for deriving a second received signal from the output signal of the transducer, the second received signal representing ultrasonic echoes related to an ultrasonic beam caused by the transducer in response to the second electric drive signal; fifth means for subjecting the first received signal to a waveform equalizing process to convert the first received signal into a third received signal having a waveform corresponding to a waveform of the second received signal; sixth means for calculating a difference between the second received signal and the third received signal, and generating a signal representing the calculated difference; seventh means for subjecting the difference signal generated by the sixth means to a detection process to derive a detection-result signal from the difference signal; and eighth means for indicating an image represented by the detection-result signal generated by the seventh means.

DESCRIPTION OF THE PREFERRED EMBODIMENTS

A prior-art ultrasonic diagnostic system will be explained below for a better understanding of this invention.

Figure 1:
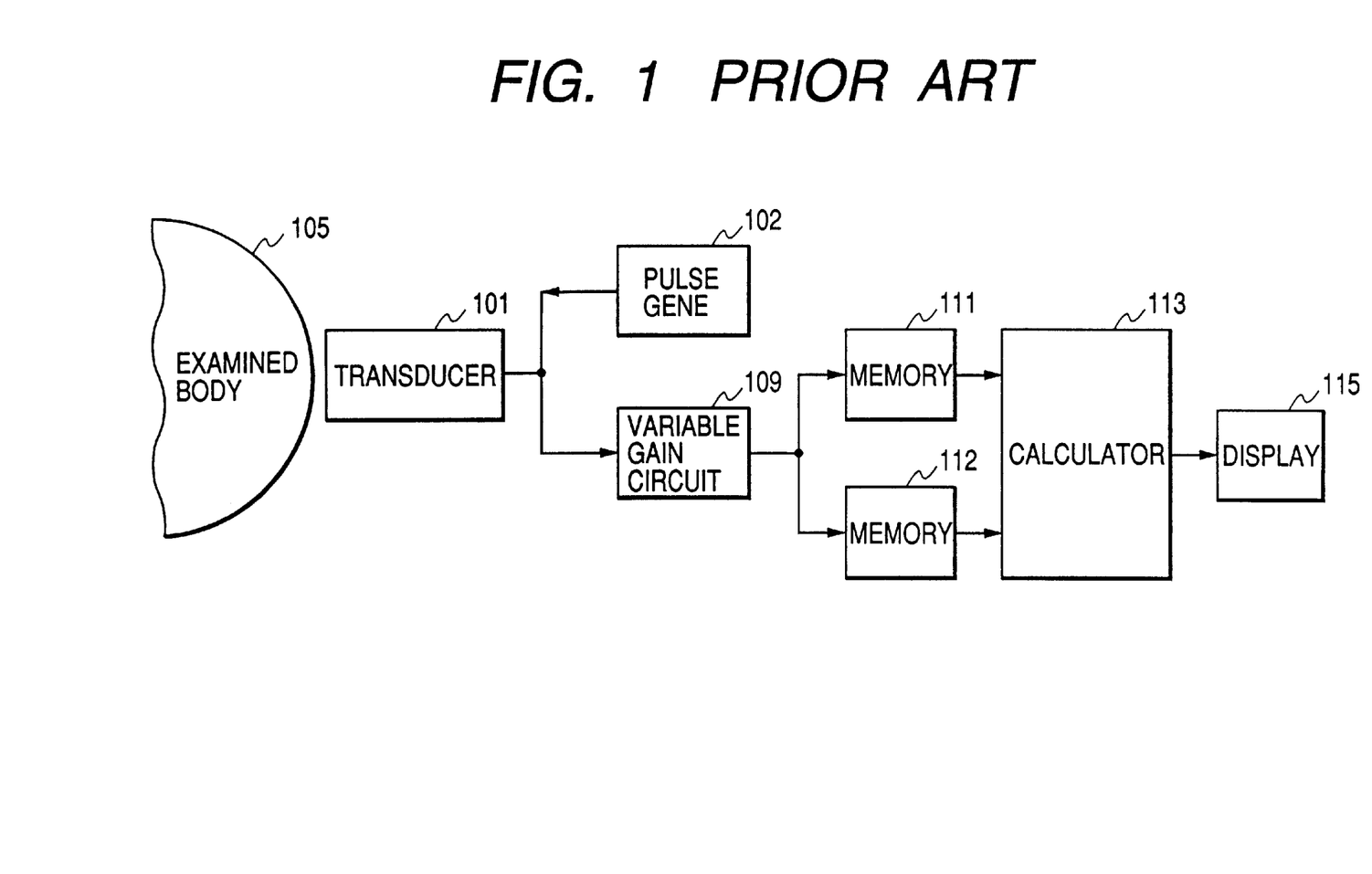
FIG. 1 is a block diagram of a prior-art ultrasonic diagnostic system.

FIG. 1 shows a prior-art ultrasonic diagnostic system disclosed in Japanese published unexamined patent application 61-279235. The prior-art system of FIG. 1 includes a transducer 101 and a pulse generating section 102. During a first transmission process, the pulse generating section 102 feeds a first electric drive pulse signal of a first predetermined amplitude "A" to the transducer 101. The transducer 101 converts the first electric drive pulse signal to an ultrasonic pulse wave having an amplitude "B". During a second transmission process after the first transmission process, the pulse generating section 102 feeds a second electric drive pulse signal of a second predetermined amplitude "2A" to the transducer 101. The second predetermined amplitude "2A" is equal to twice the first predetermined amplitude "A". The transducer 101 converts the second electric drive pulse signal to an ultrasonic pulse wave having an amplitude "2B" equal to twice the amplitude "B".

A beam of the ultrasonic pulse wave is emitted from the transducer 101 into an examined body before being propagated therein. As the ultrasonic pulse wave is propagated in the examined body, it is distorted by a nonlinearity of the examined body. The rate of the distortion in the ultrasonic pulse wave increases with the distance traveled by the ultrasonic pulse wave. In addition, the rate of the distortion in the ultrasonic pulse wave increases as the amplitude (the intensity) of the ultrasonic pulse wave is greater.

The distortion corresponds to harmonic components of the ultrasonic pulse wave. Therefore, as the ultrasonic pulse wave is more distorted, an amplitude of fundamental-frequency components of the ultrasonic pulse wave decreases.

The transducer 101 has a directivity pattern with a main lobe and side lobes. A great-amplitude portion of the ultrasonic beam which corresponds to a peak of the main lobe has a relatively great distortion. On the other hand, a small-amplitude portion of the ultrasonic beam which corresponds to the side lobes has a relatively small distortion.

In the prior-art system of FIG. 1, the ultrasonic pulse wave is scattered and reflected at places within the examined body 105, causing ultrasonic echoes. Portions of the ultrasonic echoes return to the transducer 101, and are converted thereby into an electric received signal (an electric echo signal). The transducer 101 outputs the electric received signal to a variable-gain amplifier 109.

When the received signal outputted from the transducer 101 to the amplifier 109 corresponds to the first transmission process, the amplifier 109 enlarges the received signal at a first predetermined gain "C". When the received signal outputted from the transducer 101 to the amplifier 109 corresponds to the second transmission process, the amplifier 109 enlarges the received signal at a second predetermined gain "C/2" equal to half the first predetermined gain "C". This change of the gain of the amplifier 109 is to compensate for the change of the amplitude of the electric drive pulse signal outputted from the pulse generating section 102 to the transducer 101.

In the prior-art system of FIG. 1, the amplification-resultant received signal which corresponds to the first transmission process is stored into a memory 111 from the amplifier 109. The amplification-resultant received signal which corresponds to the second transmission process is stored into a memory 112 from the amplifier 109. A calculator 113 computes a difference between the received signals in the memories 111 and 112. The calculator 113 generates a signal representing the computed difference.

Portions of the received signals in the memories 111 and 112 which are related to the side lobes have only small distortions so that the amplitudes of these signal portions are substantially equal to each other. Accordingly, the side-lobe-related signal portions substantially fully cancel each other in the difference computation by the calculator 113.

On the other hand, the rate of a distortion in a main-lobe-related portion of the received signal corresponding to the second transmission process is greater than the rate of a distortion in a main-lobe-related portion of the received signal corresponding to the first transmission process. This means that the main-lobe-related portions of the received signals in the memories 111 and 112 are significantly different from each other. It should be noted that the rate of the distortion in the ultrasonic pulse wave increases as the amplitude of the ultrasonic pulse wave is greater. Therefore, the main-lobe-related portions of the received signals in the memories 111 and 112 only partially cancel each other in the difference computation by the calculator 113. Information related to the difference between the main-lobe-related signal portions is predominant in the difference signal generated by the calculator 113. The difference signal represents a sectional image of the examined body, which has a high resolution since the difference signal closely relates to fine beams formed by main-lobe-related portions of the ultrasonic pulse waves.

In the prior-art system of FIG. 1, the calculator 113 outputs the difference signal to a display 115. The display 115 indicates the image represented by the output signal of the calculator 113.

The amplitude of the electric drive pulse signal fed to the transducer 101 from the pulse generating section 102 is changed between the first predetermined amplitude "A" and the second predetermined amplitude "2A". Thus, the prior-art system of FIG. 1 requires a power feed device designed to change the amplitude of the electric drive pulse signal. Such a power feed device causes a complicated structure of the prior-art system of FIG. 1.

First Embodiment

Figure 2:
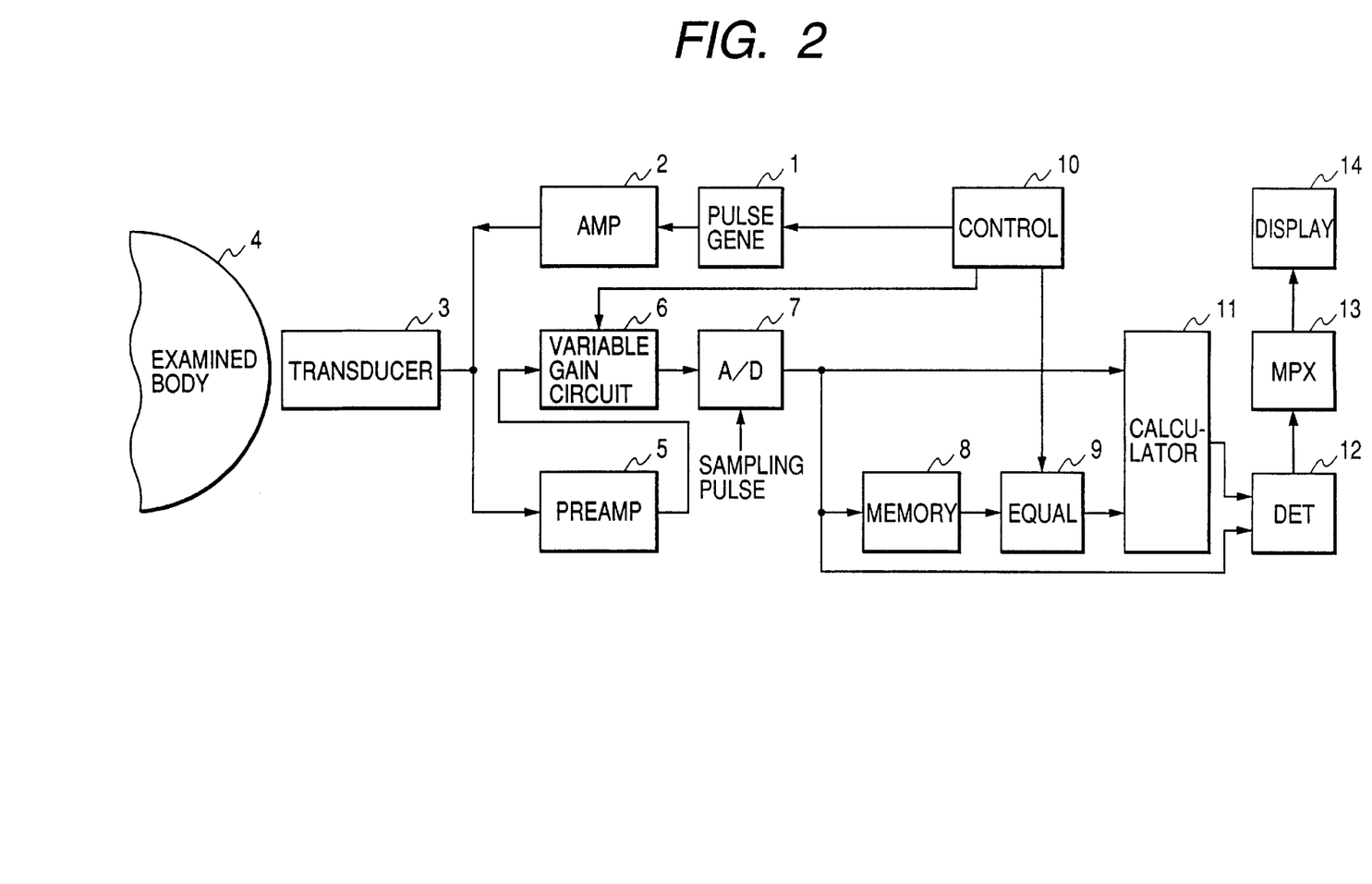
FIG. 2 is a block diagram of an ultrasonic diagnostic system according to a first embodiment of this invention.

FIG. 2 shows an ultrasonic diagnostic system according to a first embodiment of this invention. The ultrasonic diagnostic system of FIG. 2 includes a pulse generator 1, an amplifier 2, a transducer 3, a preamplifier 5, a variable-gain circuit 6, an analog-to-digital (A/D) converter 7, a memory 8, an equalizer 9, a controller 10, a calculator 11, a detector 12, a multiplexer 13, and a display 14.

The pulse generator 1 is connected to the amplifier 2. The amplifier 2 is connected to the transducer 3. The preamplifier 5 is connected to the transducer 3. The preamplifier 5 is successively followed by the variable-gain circuit 6 and the A/D converter 7. The A/D converter 7 is connected to the memory 8, the calculator 11, and the detector 12. The memory 8 is connected to the equalizer 9. The equalizer 9 is connected to the calculator 11. The calculator 11 is connected to the detector 12. The detector 12 is successively followed by the multiplexer 13 and the display 14. The controller 10 is connected to the pulse generator 1, the variable-gain circuit 6, the equalizer 9, and the multiplier 13. The pulse generator 1 produces an electric pulse signal having a predetermined fixed amplitude and a variable waveform.

During a first transmission process, the pulse generator 1 produces a first electric pulse signal in response to a control signal fed from the controller 10. The pulse generator 1 outputs the first electric pulse signal to the amplifier 2. The amplifier 2 enlarges the output signal of the pulse generator 1 into a first electric drive pulse signal. The amplifier 2 has a predetermined fixed gain. The amplifier 2 feeds the first electric drive pulse signal to the transducer 3. The transducer 3 converts the first electric drive pulse signal into a first ultrasonic pulse beam. The first ultrasonic pulse beam is emitted from the transducer 3 into a body (for example, a human body) 4 to be examined. The first ultrasonic pulse beam is propagated in the examined body 4. The first ultrasonic pulse beam is scattered and reflected at places within the examined body 4, causing first ultrasonic echoes.

During a first reception process immediately after the first transmission process, portions of the first ultrasonic echoes return to the transducer 3, and are converted thereby into a first electric received signal. The transducer 3 outputs the first electric received signal to the preamplifier 5. The preamplifier 5 enlarges the output signal of the transducer 3 at a predetermined fixed gain. The resultant output signal of the preamplifier 5 is applied to the variable-gain circuit 6. The variable-gain circuit 6 controls the amplitude of the output signal of the preamplifier 5 at a first gain, and thereby makes the output signal of the preamplifier 5 into a first gain-controlled received signal. The first gain is determined by a control signal fed from the controller 10 to the variable-gain circuit 6. The variable-gain circuit 6 outputs the first gain-controlled received signal to the A/D converter 7. The A/D converter 7 changes the first gain-controlled received signal into a first digital received signal in response to a sampling pulse signal. The sampling pulse signal is fed from a suitable device (not shown) such as a clock signal generator. The A/D converter 7 stores the first digital received signal into the memory 8. At the same time, the A/D converter 7 outputs the first digital received signal to the detector 12. The detector 12 subjects the output signal of the A/D converter 7 to a detection process, and thereby derives a first video signal from the output signal of the A/D converter 7. The detection process by the detector 12 extracts an envelope represented by the output signal of the A/D converter 7. The detector 12 outputs the first video signal to the multiplexer 13.

During a second transmission process which follows the first reception process, the pulse generator 1 produces a second electric pulse signal in response to the control signal fed from the controller 10. The control signal fed to the pulse generator 1 from the controller 10 is designed so that the second electric pulse signal will be different in waveform from the first electric pulse signal and will be equal in amplitude to the first electric pulse signal. The pulse generator 1 outputs the second electric pulse signal to the amplifier 2. The amplifier 2 enlarges the output signal of the pulse generator 1 into a second electric drive pulse signal. The amplifier 2 feeds the second electric drive pulse signal to the transducer 3. The second electric drive pulse signal is different in waveform from the first electric drive pulse signal but is equal in amplitude thereto. The transducer 3 converts the second electric drive pulse signal into a second ultrasonic pulse beam. The second ultrasonic pulse beam is emitted from the transducer 3 into the examined body 4. The second ultrasonic pulse beam is propagated in the examined body 4. The second ultrasonic pulse beam is scattered and reflected at places within the examined body 4, causing second ultrasonic echoes.

During a second reception process immediately after the second transmission process, portions of the second ultrasonic echoes return to the transducer 3, and are converted thereby into a second electric received signal. The transducer 3 outputs the second electric received signal to the preamplifier 5. The preamplifier 5 enlarges the output signal of the transducer 3 at the predetermined fixed gain. The resultant output signal of the preamplifier 5 is applied to the variable-gain circuit 6. The variable-gain circuit 6 controls the amplitude of the output signal of the preamplifier 5 at a second gain, and thereby makes the output signal of the preamplifier 5 into a second gain-controlled received signal. The second gain differs from the first gain used during the first reception process. The second gain is determined by the control signal fed from the controller 10 to the variable-gain circuit 6. The variable-gain circuit 6 outputs the second gain-controlled received signal to the A/D converter 7. The A/D converter 7 changes the second gain-controlled received signal into a second digital received signal in response to the sampling pulse signal. The A/D converter 7 outputs the second digital received signal to the detector 12. The detector 12 subjects the output signal of the A/D converter 7 to a detection process, and thereby derives a second video signal from the output signal of the A/D converter 7. The detection process by the detector 12 extracts an envelope represented by the output signal of the A/D converter 7. The detector 12 outputs the second video signal to the multiplexer 13. Also, the A/D converter 7 outputs the second digital received signal to the calculator 11. The memory 8 outputs the first digital received signal to the equalizer 9. The equalizer 9 processes the output signal of the memory 8 into a third digital received signal corresponding in waveform to the second digital received signal. The equalizer 9 outputs the third digital received signal to the calculator 11. The second digital received signal and the third digital received signal applied to the calculator 11 are synchronous with each other. The signal processing by the equalizer 9 includes amplitude control opposite to the amplitude control by the variable-gain circuit 6. The amplitude control by the equalizer 9 is adjusted by a control signal fed from the controller 10. The calculator 11 computes a difference between the second digital received signal and the third digital received signal (the output signal of the equalizer 9). The calculator 11 generates a signal representing the computed difference. The calculator 11 outputs the difference signal to the detector 12. The detector 12 subjects the difference signal to a detection process, and thereby derives a third video signal from the difference signal. The detection process by the detector 12 extracts an envelope represented by the difference signal. The detector outputs the third video signal to the multiplexer 13. The multiplexer 13 combines the first, second, and third video signals into a multiplexing-resultant video signal. The multiplexer 13 outputs the multiplexing-resultant video signal to the display 14. The display 14 indicates a sectional image of the examined body 4 which is represented by the output signal of the multiplexer 13.

A sequence of the first transmission process, the first reception process, the second transmission process, and the second reception process is periodically iterated while the direction of the ultrasonic beam emitted into the examined body 4 from the transducer 3 is changed. Accordingly, the examined body 4 is scanned by the ultrasonic beam. When a 1-frame scanning process has been completed, a 1-frame sectional image of the examined body 4 is indicated on the display 14.

The controller 10 includes a microcomputer or a similar device having a combination of an input/output port, a processing unit, a ROM, and a RAM. The controller 10 operates in accordance with a program stored in the ROM. The program is designed to implement the previously-mentioned control of the pulse generator 1, the variable-gain circuit 6, and the equalizer 9. As will be made clear later, the program is also designed to implement control of the multiplexer 13.

Figure 3:
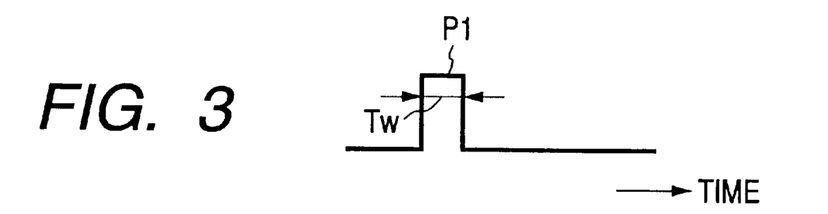
FIG. 3 is a time-domain diagram of the waveform of a first electric pulse signal which occurs in the system of FIG. 2.
Figure 4:
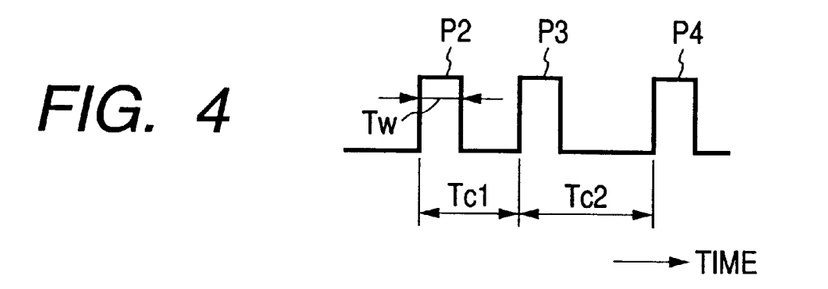
FIG. 4 is a time-domain diagram of the waveform of a second electric pulse signal which occurs in the system of FIG. 2.

FIG. 3 shows a waveform of the first electric pulse signal outputted from the pulse generator 1 during the first transmission process. As shown in FIG. 3, the first electric pulse signal has a single pulse P1 with a predetermined width Tw. FIG. 4 shows a waveform of the second electric pulse signal outputted from the pulse generator 1 during the second transmission process. As shown in FIG. 4, the second electric pulse signal has three successive pulses P2, P3, and P4. Each of the pulses P2, P3, and P4 has the predetermined width Tw. The pulses P2, P3, and P4 are equal in amplitude to the pulse P1. Thus, each of the pulses P2, P3, and P4 is equal in amplitude and width to the pulse P1. The second pulse P3 follows the first pulse P2 by a predetermined time interval Tc1. The third pulse P4 follows the second pulse P3 by a predetermined time interval Tc2.

The transducer 3 has a resonating function or a narrow-band filtering function. In other words, the transducer 3 has a signal delaying function and a signal integrating function. Therefore, ultrasonic wave caused by three successive electric input pulses has an amplitude greater than the amplitude of ultrasonic wave caused by one electric input pulse. Thus, the ultrasonic pulse beam generated in the second transmission process is greater in amplitude than the ultrasonic pulse beam generated in the first transmission process.

The ultrasonic pulse wave is emitted from the transducer 3 into the examined body 4 before being propagated therein. As the ultrasonic pulse wave is propagated in the examined body 4, it is distorted by a nonlinearity of the examined body 4. The rate of the distortion in the ultrasonic pulse wave increases with the distance traveled by the ultrasonic pulse wave. In addition, the rate of the distortion in the ultrasonic pulse wave increases as the amplitude (the intensity) of the ultrasonic pulse wave is greater.

The distortion corresponds to harmonic components of the ultrasonic pulse wave. Therefore, as the ultrasonic pulse wave is more distorted, an amplitude of fundamental-frequency components of the ultrasonic pulse wave decreases.

Figure 5:
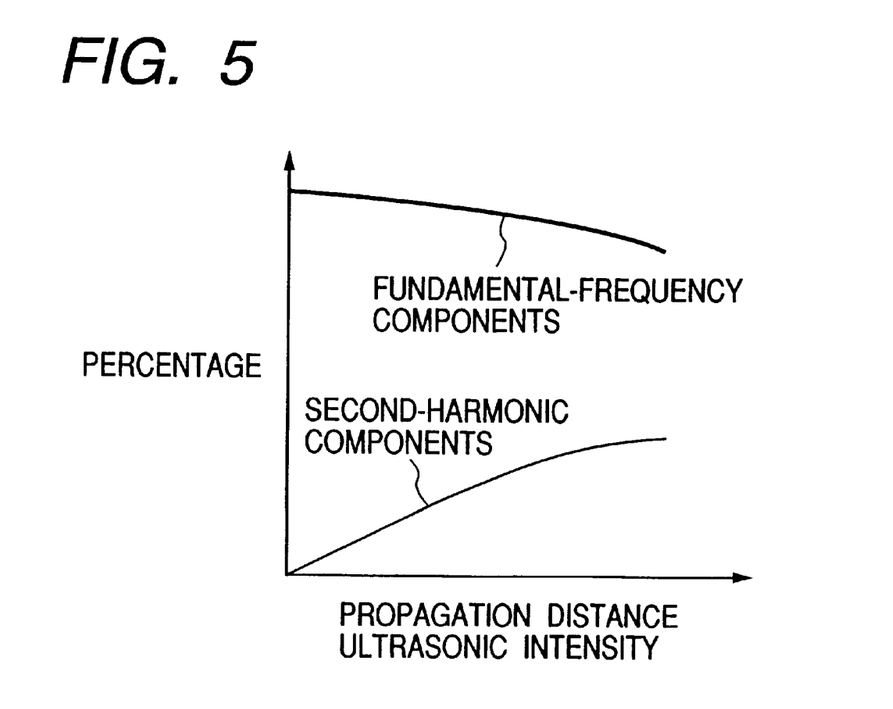
FIG. 5 is a diagram of a relation among an amount of fundamental-frequency signal components, an amount of second-harmonic signal components, a propagation distance related to ultrasonic wave, and an intensity of the ultrasonic wave.

With reference to FIG. 5, an amount of second-harmonic components of the ultrasonic pulse wave increases and an amount of fundamental-frequency components thereof decreases as the distance traveled by the ultrasonic pulse wave. In addition, an amount of second-harmonic components of the ultrasonic pulse wave increases and an amount of fundamental-frequency components thereof decreases as the intensity of the ultrasonic pulse wave increases.

Figure 6:
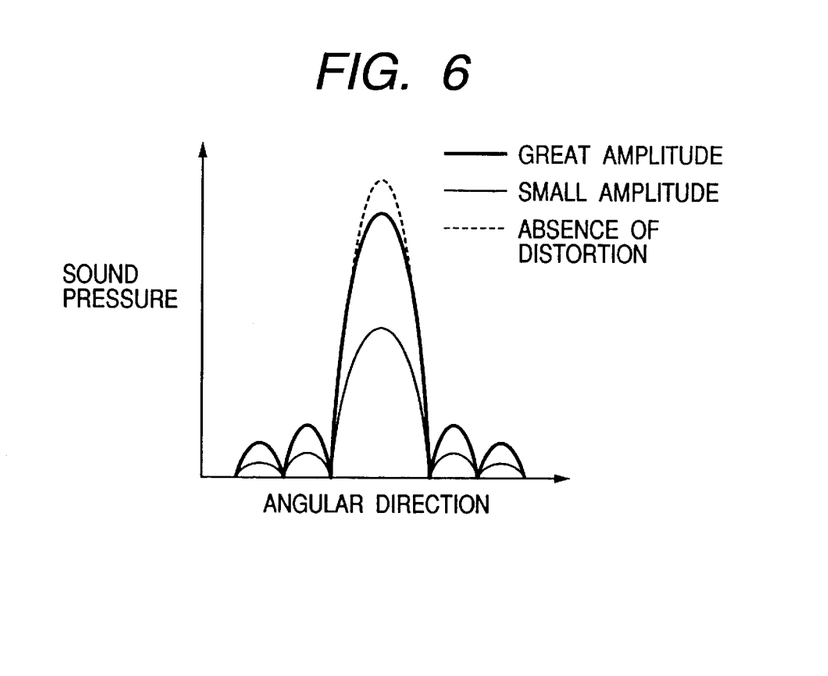
FIG. 6 is a diagram of a sound pressure related to an ultrasonic beam and a directivity pattern of a transducer in the system of FIG. 2.

As shown in FIG. 6, the transducer 3 has a directivity pattern with a main lobe and side lobes. A great-amplitude portion of the ultrasonic pulse beam which corresponds to a peak of the main lobe will have a relatively great distortion. On the other hand, a small-amplitude portion of the ultrasonic pulse beam which corresponds to the side lobes will have only a relatively small distortion.

Operation of the equalizer 9 will be explained below in more detail. The character "pa(t)" denotes the waveform (see FIG. 3) of the first electric pulse signal outputted from the pulse generator 1 during the first transmission process. Here, "t" denotes time. The character "Pa(($\omega$))" denotes Fourier transform with respect to the waveform "pa(t)". Here, "$\omega$" denotes frequency. The character "pb(t)" denotes the waveform (see FIG. 4) of the second electric pulse signal outputted from the pulse generator 1 during the second transmission process. The character "Pb($\omega$)" denotes Fourier transform with respect to the waveform "pb(t)". The character "ga(t)" denotes the waveform of the ultrasonic pulse wave corresponding to the first electric pulse signal "pa(t)". The character "Ga($\omega$)" denotes Fourier transform with respect to the waveform "ga(t)". The character "gb(t)" denotes the waveform of the ultrasonic pulse wave corresponding to the second electric pulse signal "pb(t)". The character "Gb($\omega$)" denotes Fourier transform with respect to the waveform "gb(t)". The character "h(t)" denotes an impulse response of the transducer 3. The character "H($\omega$)" denotes Fourier transform with respect to the impulse response "h(t).

The waveform "pa(t)", the waveform "ga(t), and the impulse response "h(t)" have the following relation.

$$ga(t)=h(t)*pa(t) \qquad (1)$$

where "*" denotes an operator of convolution (convolutional integration). In accordance with the equation (1), the parameters "Ga($\omega$)", "H($\omega$)", and "Pa($\omega$)" have the following relation.

$$Ga(\omega)=H(\omega)\times Pa(\omega) \qquad (2)$$

where "×" denotes an operator of multiplication. When both the sides of the equation (2) are multiplied by "Pb($\omega$)/Pa($\omega$)", the following equation is given.

$$Ga(\omega)\times\{Pb(\omega)/Pa(\omega)\}=H(\omega)\times Pb(\omega) \qquad (3)$$

Since "H($\omega$)×Pb($\omega$)=Gb($\omega$)", the equation (3) is simplified into the following equation.

$$Ga(\omega)\times\{Pb(\omega)/Pa(\omega)\}=Gb(\omega) \qquad (4)$$

The equation (4) is changed into a time-domain equation as follows.

$$gb(t)=ga(t)*invf(Pb(\omega)/Pa(\omega) \qquad (5)$$

where "invf( )" denotes an operator of inverse Fourier transform. The equation (5) means that the waveform "gb(t)" of the ultrasonic pulse wave corresponding to the second electric pulse signal "pb(t)" can be generated by implementing convolution (convolutional integration) between "invf(Pb($\omega$)/Pa($\omega$))" and the waveform "ga(t)" of the ultrasonic pulse wave corresponding to the first electric pulse signal "pa(t)".

The character "ra(t)" denotes the first received signal corresponding to the first ultrasonic pulse wave "ga(t)". The character "rb(t)" denotes the second received signal corresponding to the second ultrasonic pulse wave "gb(t)". Provided that the second received signal "rb(t)" is approximately given on the basis of a linear 1-order combination of the related ultrasonic pulses, the first received signal "ra(t)" and the second received signal "rb(t)" are substituted for the parameters "gb(t)" and "ga(t)" in the equation (5) and hence the following equation is given.

$$rb(t)=ra(t)*invf(Pb(\omega)/Pa(\omega)) \qquad (6)$$

According to the equation (6), the equalizer 9 implements convolution (convolutional integration) between "invf(Pb($\omega$))/Pa($\omega$)" and the first received signal caused by the first electric pulse signal "pa(t)", and thereby converts the first received signal into a signal corresponding to the second received signal caused by the second electric pulse signal "pb(t)".

The ultrasonic pulse wave "ga(t)" is different in amplitude from the ultrasonic pulse wave "gb(t)". Thus, the rate of the nonlinearity-caused distortion in the ultrasonic pulse wave "ga(t)" differs from the rate of the nonlinearity-caused distortion in the ultrasonic pulse wave "gb(t)". Such a distortion difference factor is introduced into the equation (6), and the equation (6) is changed into the following equation.

$$rb(t)=ra(t)*invf(Pb(\omega)/Pa(\omega))+\Delta r(t) \qquad (7)$$

where "$\Delta$r(t)" denotes a difference signal which corresponds to the difference signal generated by the calculator 11. A sectional image of the examined body 4 which is represented by the difference signal has a high resolution since the difference signal closely relates to fine beams formed by main-lobe-related portions of the ultrasonic pulse waves. The equalizer 9 implements signal processing which corresponds to the term "ra(t)*invf(Pb($\omega$)/Pa($\omega$)" in the equation (7).

The variable-gain circuit 6 is adjusted by the controller 10 so as to cancel an amplitude difference between the first received signal "ra(t)" and the second received signal "rb(t)". The cancel of the amplitude difference provides a wide dynamic range in the signal processing by the later stage. As previously indicated, the equalizer 9 implements the amplitude control opposite to the amplitude control by the variable-gain circuit 6.

It should be noted that an attenuator may be provided between the transducer 3 and the preamplifier 5.

As understood from FIGS. 3 and 4, the waveform of the second electric pulse signal "pb(t)" is equivalent to the addition of the waveform of the first electric pulse signal "pa(t)", the waveform of the delayed electric pulse signal "pa(t−Tc1)", and the waveform of the delayed electric pulse signal "pa(t−Tc1−Tc2)". Thus, the waveform of the second received signal "rb(t)" is given by the waveform of the first received signal "ra(t)", the waveform of the delayed received signal "ra(t−Tc1)", and the waveform of the delayed received signal "ra(t−Tc1−Tc2)" according to the following equation.

$$rb(t)=ra(t)+ra(t-Tc1)+ra(t-Tc1-Tc2)+\Delta r(t) \qquad (8)$$

where "$\Delta$r(t)" denotes the difference signal. The equalizer 9 implements signal processing which corresponds to the addition of the terms "ra(t)", "ra(t−Tc1)", and "ra(t−Tc1−Tc2)" in the equation (8).

Figure 7:
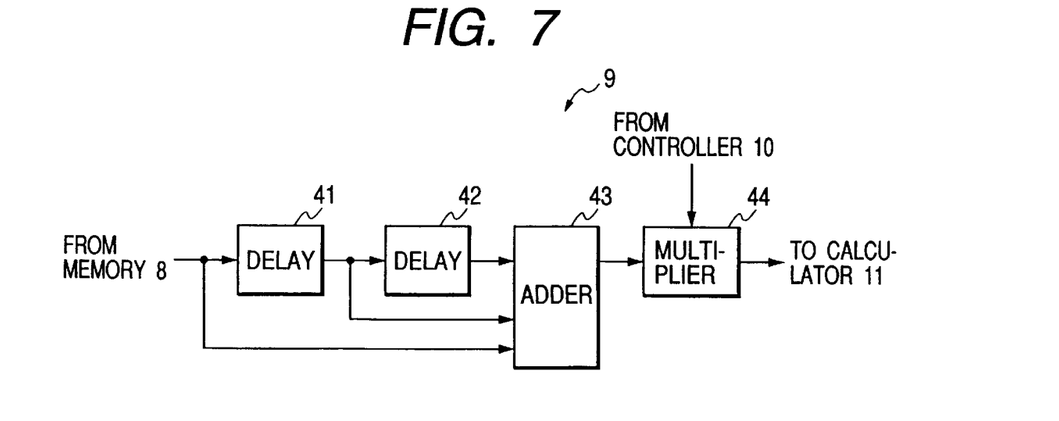
FIG. 7 is a block diagram of an equalizer in FIG. 2.

As shown in FIG. 7, the equalizer 9 includes delay circuits 41 and 42, an adder 43, and a multiplier 44. The input terminal of the delay circuit 41 is connected to the memory 8 (see FIG. 2). The output terminal of the delay circuit 41 is connected to the input terminal of the delay circuit 42. The adder 43 has first, second, and third input terminals which are connected to the memory 8 (see FIG. 2), the output terminal of the delay circuit 41, and the output terminal of the delay circuit 42, respectively. The output terminal of the adder 43 is connected to a first input terminal of the multiplier 44. A second input terminal of the multiplier 44 is connected to the controller 10 (see FIG. 2). The output terminal of the multiplier 44 is connected to the calculator 11 (see FIG. 2).

The output signal of the memory 8 (see FIG. 2) is applied to the delay circuit 41 and the adder 43 as a non-delayed signal "ra(t)". The delay circuit 41 defers the non-delayed signal "ra(t)" by the time Tc1 to generate a delayed signal "ra(t−Tc1)". The delay circuit 41 outputs the delayed signal "ra(t−Tc1)" to the delay circuit 42 and the adder 43. The delay circuit 42 defers the delayed signal "ra(t−Tc1)" by the time Tc2 to generate a further delayed signal "ra(t−Tc1−Tc2)". The delay circuit 42 outputs the further delayed signal "ra(t−Tc1−Tc2)" to the adder 43. The device 43 adds the non-delayed "ra(t)", the delayed signal "ra(t−Tc1)", and the further delayed signal "ra(t−Tc1Tc2)". The adder 43 outputs the addition-resultant resultant signal to the multiplier 44. The device 44 multiplies the addition-resultant signal by a gain factor or a gain coefficient fed from the controller 10 (see FIG. 2). The multiplier 44 implements gain control opposite to the gain control by the variable-gain circuit 6 (see FIG. 2). The multiplier 44 outputs the multiplication-resultant resultant signal to the calculator 11 (see FIG. 2) as the third digital received signal.

Figure 8:
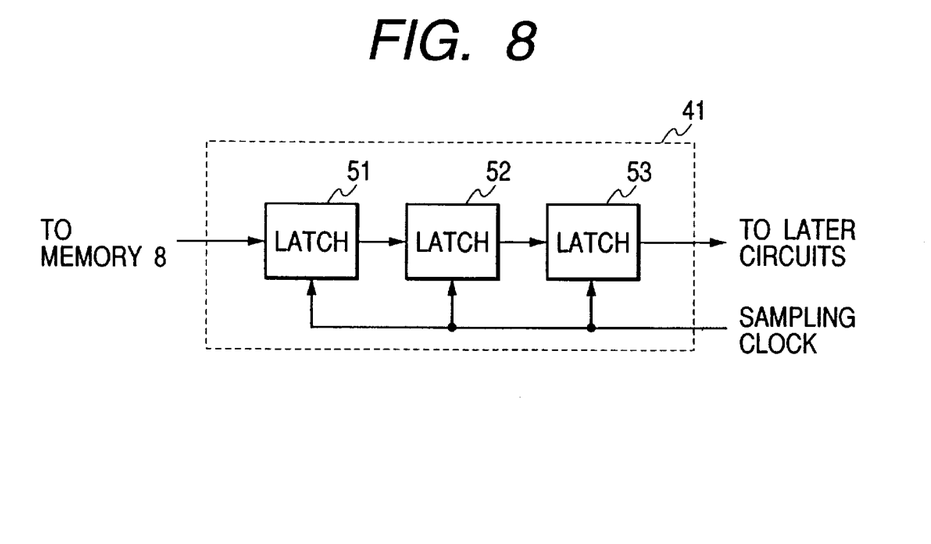
FIG. 8 is a block diagram of a delay circuit in FIG. 7.

As shown in FIG. 8, the delay circuit 41 has a series combination of latch circuits 51, 52, and 53 controlled by a sampling pulse signal. The delay circuit 42 has a structure similar to the structure of the delay circuit 41.

Operation of the multiplexer 13 will be explained below in detail. The character "ea(t)" denotes a detection-result signal outputted from the detector 12 which corresponds to the first electric pulse signal "pa(t)". The detection-result signal "ea(t)" is equal to the previously-mentioned first video signal. The character "eb(t)" denotes a detection-result signal outputted from the detector 12 which corresponds to the second electric pulse signal "pb(t)". The detection-result signal "eb(t)" is equal to the previously-mentioned second video signal. The character "Δe(t)" denotes a detection-result signal outputted from the detector 12 which corresponds to the difference signal "Δr(t)". The detection-result signal "Δe(t)" is equal to the previously-mentioned third video signal. The multiplexer 13 combines the detection-result signals "ea(t)", "eb(t)", and "Δe(t)" into the multiplexing-resultant signal "v(t)" according to the following equation.

$$V(t) = ea(t) \cdot wa(t) + eb(t) \cdot wb(t) + \Delta e(t) \cdot w\Delta(t) \qquad (9)$$

where "wa(t)", "wb(t)", and "wΔ(t)" denote weight coefficients which vary in accordance with time. The weight coefficients "wa(t)", "wb(t)", and "wΔ(t)" are temporally adjusted by, for example, the controller 10.

Figure 9:
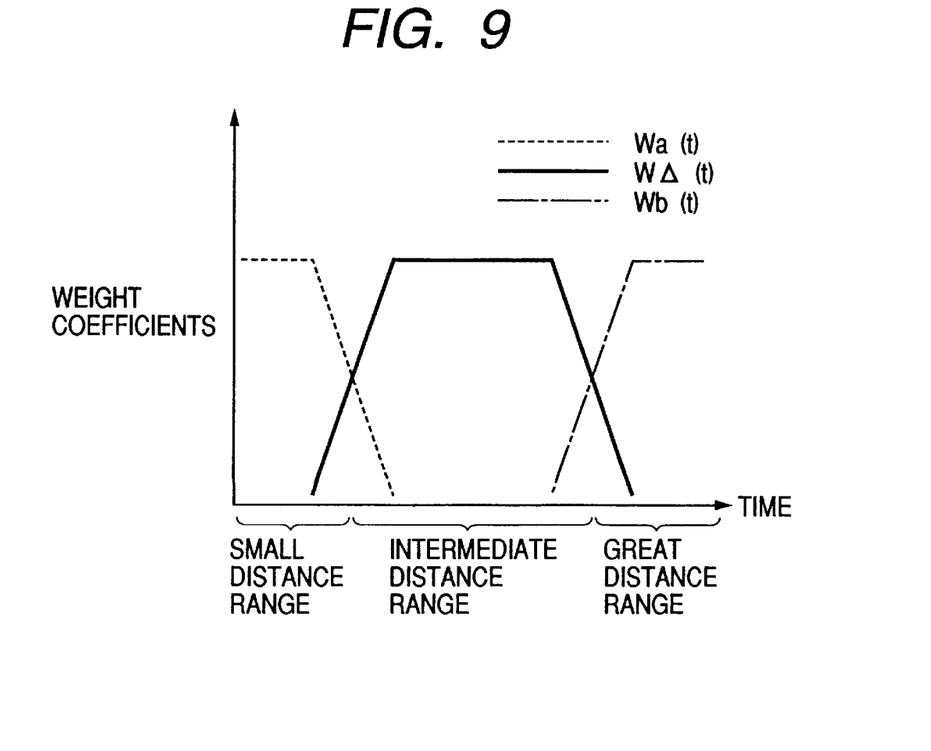
FIG. 9 is a diagram of relations between weight coefficients and a distance in the system of FIG. 2.

The dependences of the weight coefficients "wa(t)", "wb(t)", and "wΔ(t)" upon time provide dependences of the weight coefficients "wa(t)", "wb(t)", and "wΔ(t)" upon the distance between the transducer 3 and a scanned point within the examined body 4. As shown in FIG. 9, in a small distance range, the weight coefficient "wa(t)" for the detection-result signal "ea(t)" corresponding to the first electric pulse signal "pa(t)" is predominant over the weight coefficients "wb(t)" and "wΔ(t)". In an intermediate distance range, the weight coefficient "wΔ(t)" for the detection-result signal "Δe(t)" corresponding to the difference signal "Δr(t)" is predominant over the weight coefficients "wa(t) and "wb(t)". In a great distance range, the weight coefficient "wb(t)" for the detection-result signal "eb(t)" corresponding to the second electric pulse signal "pb(t)" is predominant over the weight coefficients "wa(t)" and "wΔ(t)". In FIG. 9, the intermediate distance range extends between the small distance range and the great distance range. The great distance range is defined as being beyond the focal point related to the ultrasonic pulse beam emitted from the transducer 3.

It should be noted that the calculator 11 may compute a difference between low-frequency signals resulting from detection processes.

Second Embodiment

A second embodiment of this invention is similar to the first embodiment thereof except for the following design change.

Figure 10:
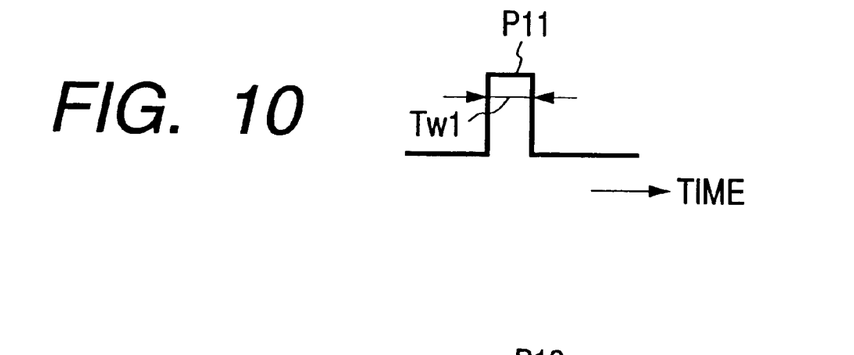
FIG. 10 is a time-domain diagram of the waveform of a first electric pulse signal which occurs in an ultrasonic diagnostic system according to a second embodiment of this invention.
Figure 11:
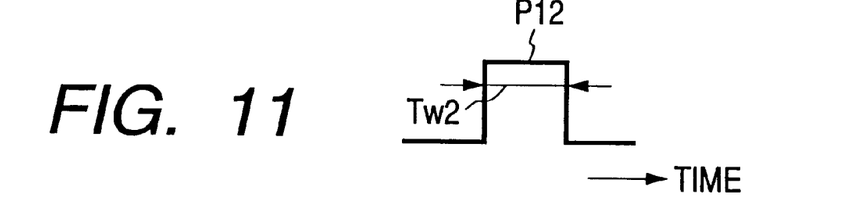
FIG. 11 is a time-domain diagram of the waveform of a second electric pulse signal which occurs in the system according to the second embodiment of this invention.

Regarding the second embodiment of this invention, FIG. 10 shows a waveform of the first electric pulse signal outputted from the pulse generator 1 during the first transmission process. As shown in FIG. 10, the first electric pulse signal has a single pulse P11 with a predetermined width Tw1. FIG. 11 shows a waveform of the second electric pulse signal outputted from the pulse generator 1 during the second transmission process. As shown in FIG. 11, the second electric pulse signal has a single pulse P12 with a predetermined width Tw2 greater than the predetermined width Tw1. The pulse P12 is equal in amplitude to the pulse P11.

In the second embodiment of this invention, the equalizer 9 includes a delay circuit for providing a signal delay corresponding to the difference of the width Tw2 of the pulse P12 in the second electric pulse signal from the width Tw1 of the pulse P11 in the first electric pulse signal.

Third Embodiment

A third embodiment of this invention is similar to the first embodiment thereof except for the following design change.

Figures 12, 13:
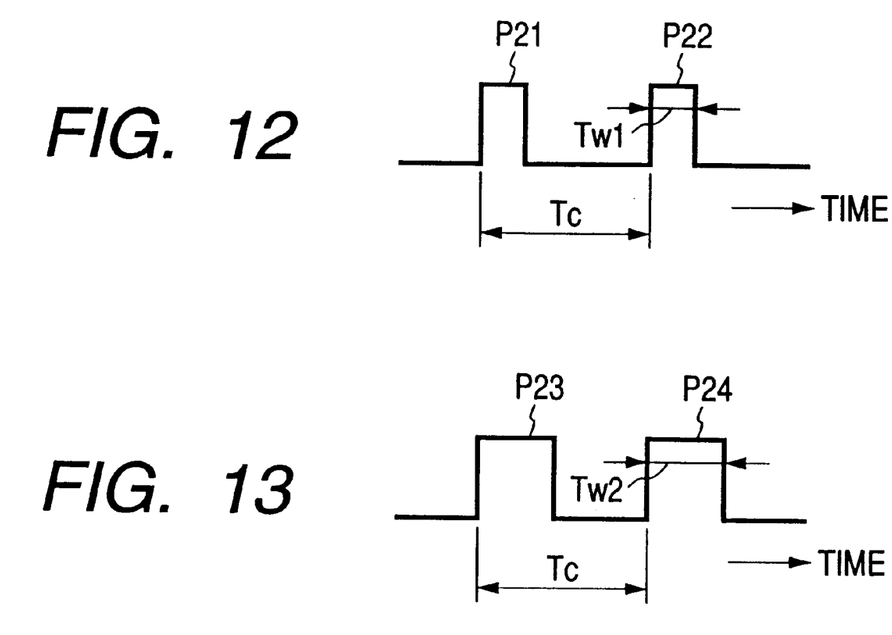
FIG. 12 is a time-domain diagram of the waveform of a first electric pulse signal which occurs in an ultrasonic diagnostic system according to a third embodiment of this invention.
FIG. 13 is a time-domain diagram of the waveform of a second electric pulse signal which occurs in the system according to the third embodiment of this invention.

Regarding the third embodiment of this invention, FIG. 12 shows a waveform of the first electric pulse signal outputted from the pulse generator 1 during the first transmission process. As shown in FIG. 12, the first electric pulse signal has two successive pulses P21 and P22. Each of the pulses P21 and P22 has a predetermined width Tw1. The second pulse P22 follows the first pulse P21 by a predetermined time interval Tc. FIG. 13 shows a waveform of the second electric pulse signal outputted from the pulse generator 1 during the second transmission process. As shown in FIG. 13, the second electric pulse signal has two successive pulses P23 and P24. Each of the pulses P23 and P24 has a predetermined with Tw2 greater than the predetermined width Tw1. The pulses P23 and P24 are equal in amplitude to the pulses P21 and P22. The second pulse P24 follows the first pulse P23 by the predetermined time interval Tc.

What is claimed is:

1. An ultrasonic diagnostic system comprising:

a transducer;

first means for feeding a first electric drive signal to the transducer;

second means for feeding a second electric drive signal to the transducer at a time different from a time at which the first means feeds the first electric drive signal to the transducer, the second electric drive signal having a waveform different from a waveform of the first electric drive signal;

third means for deriving a first received signal from an output signal of the transducer, the first received signal representing ultrasonic echoes related to an ultrasonic beam caused by the transducer in response to the first electric drive signal;

fourth means for deriving a second received signal from the output signal of the transducer, the second received signal representing ultrasonic echoes related to an ultrasonic beam caused by the transducer in response to the second electric drive signal;

fifth means for subjecting the first received signal to a waveform equalizing process to convert the first received signal into a third received signal having a waveform corresponding to a waveform of the second received signal; and sixth means for calculating a difference between the second received signal and the third received signal, and generating a signal representing the calculated difference.

2. An ultrasonic diagnostic system as recited in claim 1, wherein the first electric drive signal and the second electric drive signal include pulse signals respectively, and are different from each other in pulse number.

3. An ultrasonic diagnostic system as recited in claim 1, wherein the first electric drive signal includes a pulse; the second electric drive signal includes plural successive pulses; the fifth means comprises a series combination of delay circuits, a total number of which is equal to a total number of the plural successive pulses minus one; and the delay circuits provide signal delays corresponding to respective time intervals between the plural successive pulses.

4. An ultrasonic diagnostic system as recited in claim 1, wherein the first electric drive signal includes a pulse and the second electric drive signal includes a pulse, and the pulse in the first electric drive signal has a width different from a width of the pulse in the second electric drive signal.

5. An ultrasonic diagnostic system as recited in claim 4, wherein the fifth means comprises a delay circuit providing a signal delay corresponding to a difference of the width of the pulse in the second electric drive signal from the width of the pulse in the first electric drive signal.

6. An ultrasonic diagnostic system as recited in claim 1, wherein the fifth means has a function of controlling a signal amplitude.

7. An ultrasonic diagnostic system comprising:

a transducer;

first means for feeding a first electric drive signal to the transducer;

second means for feeding a second electric drive signal to the transducer at a time different from a time at which the first means feeds the first electric drive signal to the transducer, the second electric drive signal having a waveform different from a waveform of the first electric drive signal;

third means for deriving a first received signal from an output signal of the transducer, the first received signal representing ultrasonic echoes related to an ultrasonic beam caused by the transducer in response to the first electric drive signal;

fourth means for deriving a second received signal from the output signal of the transducer, the second received signal representing ultrasonic echoes related to an ultrasonic beam caused by the transducer in response to the second electric drive signal;

fifth means for subjecting the first received signal to a waveform equalizing process to convert the first received signal into a third received signal having a waveform corresponding to a waveform of the second received signal;

sixth means for calculating a difference between the second received signal and the third received signal, and generating a signal representing the calculated difference;

seventh means for subjecting the first received signal to a detection process to derive a first detection-result signal from the first received signal;

eighth means for subjecting the second received signal to a detection process to derive a second detection-result signal from the second received signal;

ninth means for subjecting the difference signal generated by the sixth means to a detection process to derive a third detection-result signal from the difference signal;

tenth means for combining the first detection-result signal, the second detection-result signal, and the third detection-result signal into a multiplexing-resultant signal; and eleventh means for indicating an image represented by the multiplexing-resultant signal generated by the tenth means.

8. An ultrasonic diagnostic system as recited in claim 7, wherein the tenth means comprises means for combining the first detection-result signal, the second detection-result signal, and the third detection-result signal at a variable mixing ratio, and means for controlling the mixing ratio in accordance with a lapse of time.

9. An ultrasonic diagnostic system as recited in claim 7, wherein the tenth means comprises means for combining the first detection-result signal, the second detection-result signal, and the third detection-result signal at a variable mixing ratio, and means for controlling the mixing ratio so that the first detection-result signal is predominant over the second and third detection-result signals in a small distance range, that the second detection-result signal is predominant over the first and third detection-result signals in a great distance range, and that the third detection-result signal is predominant over the first and second detection-result signals in an intermediate distance range between the small distance range and the great distance range.

10. An ultrasonic diagnostic system comprising:

a transducer;

first means for feeding a first electric drive signal to the transducer;

second means for feeding a second electric drive signal to the transducer at a time different from a time at which the first means feeds the first electric drive signal to the transducer, the second electric drive signal having a waveform different from a waveform of the first electric drive signal;

third means for deriving a first received signal from an output signal of the transducer, the first received signal representing ultrasonic echoes related to an ultrasonic beam caused by the transducer in response to the first electric drive signal;

fourth means for deriving a second received signal from the output signal of the transducer, the second received signal representing ultrasonic echoes related to an ultrasonic beam caused by the transducer in response to the second electric drive signal;

fifth means for subjecting the first received signal to a waveform equalizing process to convert the first received signal into a third received signal having a waveform corresponding to a waveform of the second received signal;

sixth means for calculating a difference between the second received signal and the third received signal, and generating a signal representing the calculated difference;

seventh means for subjecting the difference signal generated by the sixth means to a detection process to derive a detection-result signal from the difference signal; and eighth means for indicating an image represented by the detection-result signal generated by the seventh means.

* * * * *